(12) United States Patent
Rudell et al.

(10) Patent No.: US 9,577,683 B2
(45) Date of Patent: Feb. 21, 2017

(54) SYSTEMS, TRANSCEIVERS, RECEIVERS, AND METHODS INCLUDING CANCELLATION CIRCUITS HAVING MULTIPORT TRANSFORMERS

(71) Applicant: UNIVERSITY OF WASHINGTON THROUGH ITS CENTER FOR COMMERCIALIZATION, Seattle, WA (US)

(72) Inventors: Jacques Christophe Rudell, Seattle, WA (US); Tong Zhang, Seattle, WA (US); Apsara Ravish Suvarna, Seattle, WA (US)

(73) Assignee: University of Washington Through Its Center For Commercialization, Seattle, WA (US)

( * ) Notice: Subject to any disclaimer, the term of this patent is extended or adjusted under 35 U.S.C. 154(b) by 25 days.

(21) Appl. No.: 14/258,896

(22) Filed: Apr. 22, 2014

(65) Prior Publication Data
US 2014/0315501 A1    Oct. 23, 2014

Related U.S. Application Data
(60) Provisional application No. 61/814,745, filed on Apr. 22, 2013.

(51) Int. Cl.
| H04B 15/00 | (2006.01) |
|---|---|
| H04B 1/40 | (2015.01) |
| H04B 1/04 | (2006.01) |
| H04B 1/18 | (2006.01) |
| H04B 1/525 | (2015.01) |

(52) U.S. Cl.
CPC .............. *H04B 1/0458* (2013.01); *H04B 1/18* (2013.01); *H04B 1/525* (2013.01)

(58) Field of Classification Search
USPC ...... 455/78, 67.13, 292, 290, 280, 296, 304, 455/276.1
See application file for complete search history.

(56) References Cited

U.S. PATENT DOCUMENTS
| 4,801,901 A | 1/1989 | Ayasli |
|---|---|---|
| 7,366,244 B2 | 4/2008 | Gebara et al. |
| 7,541,890 B2 * | 6/2009 | Cheung ..................... H01P 1/10 333/117 |

(Continued)

OTHER PUBLICATIONS
Abdelhalem, Sherif H. et al., "*A Tunable Differential Duplexer in 90nm CMOS*", IEEE Radio Frequency Integrated Circuits Symposium, 2012, 101-104.

(Continued)

*Primary Examiner* — Edward Urban
*Assistant Examiner* — Ralph H Justus
(74) *Attorney, Agent, or Firm* — Dorsey & Whitney LLP

(57) ABSTRACT

Example apparatuses and methods for cancellation of transmitter self-interference leakage in a transceiver are described. An example transceiver includes a multiport transformer that may be used as a part of the impedance matching network on the receiver side of the transceiver. One primary port of the multiport transformer may form a portion of a cancellation circuit that, along with other components in a cancellation path, provide amplitude and/or phase modulation to a cancellation signal. The cancellation circuit may tunable and may include only reactive components in some examples.

20 Claims, 7 Drawing Sheets

(56) References Cited

U.S. PATENT DOCUMENTS

| | | | | |
|---|---|---|---|---|
| 8,055,235 | B1* | 11/2011 | Gupta | H04B 1/10 455/296 |
| 8,412,261 | B2 | 4/2013 | Yi | |
| 8,599,726 | B2 | 12/2013 | Mikhemar et al. | |
| 8,971,219 | B2* | 3/2015 | Choksi | H03H 7/09 333/129 |
| 2008/0101099 | A1* | 5/2008 | Jacobs | H02M 7/06 363/47 |
| 2008/0164941 | A1* | 7/2008 | Lee | H03F 3/195 330/124 R |
| 2009/0213770 | A1* | 8/2009 | Mu | H04B 1/123 370/281 |
| 2011/0299433 | A1* | 12/2011 | Darabi | H04B 1/525 370/277 |
| 2013/0109330 | A1 | 5/2013 | Sahota et al. | |
| 2013/0194978 | A1* | 8/2013 | Andersson | H04B 1/50 370/278 |
| 2013/0249728 | A1* | 9/2013 | Ikeda | H03M 1/46 341/155 |
| 2013/0258911 | A1 | 10/2013 | Choksi | |
| 2014/0011461 | A1* | 1/2014 | Bakalski | H04B 1/3805 455/78 |

OTHER PUBLICATIONS

Mikhemar, M. et al., "*A Tunable Integrated Duplexer With 50dB Isolation in 40nm CMOS*", ISSCC 2009, Session 22, PA and Antenna Interface 22.7, 2009, 385-387.

Mikhemar, Mohyee et al., "*A Multiband RF Antenna Duplexer on CMOS: Design and Performance*", IEEE Journal of Solid State Circuits, vol. 48, No. 9, Sep. 2013.

Aparin, et al., "An Integrated LMS Adaptive Filter of TX Leakage for CDMA Receiver Front Ends", IEEE Journal of Solid-State Circuits, vol. 41, No. 5, May 2006, 12 pgs.

Ayazian, et al., "Feedforward Interference Cancellation in Radio Receive Front-Ends", IEEE Transactions on Circuits and Systems, vol. 54, No. 10, Oct. 2007, 5 pgs.

Chowdhury, et al., "A Single-Chip Highly Linear 2.4GHz 30dBm Power Amplifier in 90nm CMOS", IEEE Int'l Solid-State Circuits Conference: Digest of Tech. Papers, Feb. 2009, 3 pgs.

Darabi, "A Blocker Filtering Technique for SAW-Less Wireless Receivers", IEEE Journal of Solid-State Circuits, vol. 42, No. 12, Dec. 2007, 8 pgs.

Khatri, et al., "A SAW-less CMOS CDMA Receiver With Active Tx Filtering", IEEE Custom Integrated Circuits Conference, Sep. 2009, 4 pgs.

Khatri, et al., "An Active Transmitter Leakage Suppression Technique for CMOS SAW-Less CDMA Receiver", IEEE Journal of Solid-State Circuits, vol. 45, No. 8, Aug. 2010, 12 pgs.

Khatri, et al., "Integrated RF Interference Suppression Filter Design Using Bond-Wire Inductors", IEEE Transactions on Microwave Theory and Techniques, vol. 56, No. 5, May 2008, 11 pgs.

Kim, et al., "A CMOS Transmitter Leakage Canceller for WCDMA Applications", IEEE Transactions on Microwave Theory and Techniques, vol. 61, No. 9, Sep. 2013, 8 pgs.

Mikhemar, et al., "An On-Chip Wideband and Low-Loss Duplexer for 3G/4G CMOS Radios", IEEE Symposium on VLSI Circuits, Jun. 2010, 2 pgs.

Zhang, et al., "An Integrated CMOS Passive Transmitter Leakage Suppression Technique for FDD Radios", IEEE Radio Frequency Integrated Circuits Symposium, Jun. 2014, 4 pgs.

Zhou, et al., "A Blocker-Resilient Wideband Receiver with Low-Noise Active Two-Point Cancellation of >0dBm TX Leakage and TX Noise in RX Band for FDD/Co-Existence", IEEE Int'l Solid-State Circuits Conference—Digest of Technical Papers, Feb. 2014, 3 pgs.

\* cited by examiner

SYSTEMS, TRANSCEIVERS, RECEIVERS, AND METHODS INCLUDING CANCELLATION CIRCUITS HAVING MULTIPORT TRANSFORMERS

CROSS REFERENCE TO RELATED APPLICATIONS

This application claims the benefit of priority pursuant to 35 U.S.C §119(e) of U.S. Provisional Application No. 61/814,745 filed Apr. 22, 2013 entitled "A Radio Transmit-to-Receive Self-Interference Cancellation Technique," which is hereby incorporated herein by reference in its entirety for any purpose.

TECHNICAL FIELD

Examples described herein relate to cancellation of transmitter leakage in a transceiver; examples of cancellation circuits including transformers having at least two primary and one secondary winding are described.

BACKGROUND

The continued demand for higher levels of access and increased data rates for a variety of wireless applications, from mobile smart phone devices to back haul point-to-point communications, continues to drive research towards high speed, wideband and low cost radios. Frequency division duplexing (FDD), rather than time division multiple access (TDMA) standards, achieve higher speeds. However, in a FDD system, since the transmitter and the receiver share the same antenna and operate at the same time using a duplexer, a non-negligible transmitter leakage signal may appear at the transmitter front-end through the duplexer. For example, in the WCDMA standard, although the duplexer significantly suppresses transmitter leakage (up to 55 dB), the residual attenuated signal still remains at the receiver input. Thus, the transmitter leakage is often the largest blocker present at the receiver input, making a low-noise and low-power linear receiver design very challenging. This leakage problem is exacerbated by applications such as future cognitive and software-defined radios where the duplex band would ideally be kept to a minimum, to improve spectral efficiency. An off-chip surface acoustic wave (SAW) filter is usually connected between the low noise amplifier and downconverter to further suppress transmitter leakage. However, these filters are band specific, prohibiting highly programmable solutions. Moreover, additional discrete filters are area inefficient, and increase cost/power consumption.

Several recent efforts have attempted to attenuate or reduce the effect of transmitter leakage in the receiver signal path. However, these recent approaches tend to utilize an active cancellation path, which is problematic from a noise and power perspective.

SUMMARY

Examples described herein include apparatuses and methods for cancellation of leakage in a transceiver. An example transceiver in accordance with this disclosure includes a multiport transformer that may be used as a part of the impedance matching network on the receiver side of the transceiver. The multiport transformer includes at least a first primary port for receiving an incoming signal and a second primary port that mixes a cancellation signal with the incoming signal so as to cancel a leakage signal from the incoming signal in a secondary port. The second primary port is connected to a cancellation path that extends between the transmitter and receiver sides of the transceiver. The second primary port includes a winding that is wound so as to generate the cancelation signal, at least in part by, inverting a portion of a transmitter signal that is diverted into the cancellation path. The second primary port may form a portion of a cancellation circuit that includes other components in the cancellation path to provide amplitude and/or phase modulation to the cancellation signal so that the cancellation signal is calibrated to be an additive inverse of the leakage signal. The cancellation circuit may be made tunable and may include only reactive components to minimize any noise contribution at the input of the receiver.

One embodiment is directed to a transceiver, comprising a transmitter configured to transmit an outgoing signal; a receiver configured to receive a received signal; and a cancellation circuit, the cancellation circuit configured to combine a cancellation signal with an incoming signal to provide the received signal, the cancellation circuit comprising a transformer, the transformer comprising: a first primary winding, the first primary winding configured to receive the incoming signal; a second primary winding, the second primary winding coupled to the transmitter and configured to receive the cancellation signal, wherein the cancellation signal is based, at least in part on the outgoing signal; and a secondary winding inductively coupled to the first and second primary windings; wherein the first and second primary windings are configured to have a phase relationship such that the cancellation signal is at least partially subtracted from the incoming signal to generate the received signal in the secondary winding.

In some embodiments, the cancellation circuit includes only reactive components.

In some embodiments, the first primary winding is operatively coupled to an antenna to receive the incoming signal; the receiver further comprises an amplifier and the secondary winding is coupled to the amplifier and configured to provide the received signal to the amplifier.

In some embodiments, the incoming signal includes the received signal and a leaked signal, wherein the leaked signal is based, at least in part, on coupling between the outgoing signal and the receiver, and wherein the cancellation signal is configured to match the leaked signal.

In some embodiments, the cancellation circuit further comprises an attenuator coupled between the transmitter and the second primary winding, the attenuator configured to modulate an amplitude of the cancellation signal to match the leaked signal.

In sonic embodiments, the attenuator includes tunable capacitors and the capacitors are configured to be tuned during a calibration phase of the transceiver.

In some embodiments, the transformer further comprises a third primary winding, wherein the third primary winding is inductively coupled to the secondary winding; and wherein the cancellation circuit further comprises a phase modulator coupled to the third primary winding, wherein the phase modulator is configured to modulate a phase of the cancellation signal to match a phase of the leaked signal.

In some embodiments, the phase modulator comprises a tunable capacitor disposed between the first and second phase modulator leads.

In some embodiments, the cancellation circuit presents a high impedance to the transmitter.

In some embodiments, the receiver and the transmitter are integrally disposed on the same substrate.

One embodiment is directed to a receiver, comprising a low noise amplifier; a transformer comprising first and second primary windings and a secondary winding inductively coupled to the first and second primary windings, the secondary winding further coupled to the low noise amplifier; wherein the first primary winding is operatively connected to an antenna to receive an incoming signal; the second primary winding is configured to couple to a transmitter and receive a cancellation signal based, at least in part, on an outgoing signal, wherein the cancellation signal is calibrated to at least partially cancel a leakage signal present at the first primary winding; and the first and second primary windings are configured to have a phase relationship such that the cancellation signal is at least partially subtracted from the incoming signal to generate a received signal in the secondary winding.

In some embodiments, the leakage signal is a component of the outgoing signal and is due at least in part to leakage from the transmitter.

In some embodiments, the cancellation circuit further comprises an attenuator, the attenuator comprising: a plurality of tunable capacitors configured to modulate an amplitude of the outgoing signal to generate the cancellation signal.

In some embodiments, the tunable capacitors are configured to modulate the amplitude such that the cancellation signal has an amplitude that matches an amplitude of the leakage signal.

In some embodiments, the transformer further comprises a third primary winding that is inductively coupled to the secondary winding; and the cancellation circuit further comprises a phase modulator coupled to the third primary winding and configured to shift a phase of the cancellation signal to match a phase of the leakage signal.

In some embodiments, the phase modulator comprises a tunable capacitor.

One embodiment is directed to a method, comprising receiving an incoming signal at a receiver; transmitting an outgoing signal from a transmitter: generating a cancellation signal based on the outgoing signal; and combining the cancellation signal with the incoming signal, using at least a three-port transformer, to provide a received signal.

In some embodiments, generating the cancellation signal includes modulating an amplitude of the cancellation signal to match an amplitude of a leakage signal included in the incoming signal, wherein the leakage signal is based, at least in part, on the outgoing signal.

In some embodiments, combining the cancellation signal with the incoming signal comprises using at least a four-port transformer.

In some embodiments, generating the cancellation signal includes modulating a phase of the cancellation signal to match a phase of a leakage signal included in the incoming signal, wherein the leakage signal is based, at least in part, on the outgoing signal.

This Summary is not intended to identify key features or essential features of the claimed subject matter, nor is it intended to be used to limit the scope of the claimed subject matter.

DETAILED DESCRIPTION

Examples are described herein of systems, apparatuses, and methods for cancellation of transmitter leakage in a transceiver. Example transceivers include a multiport transformer that may be used as a part of the impedance matching network on the receiver side of the transceiver. The multiport transformer includes at least a first primary port connected to a first primary winding for receiving an incoming signal and a second primary port connected to a second primary winding providing a cancellation signal. The first and second primary windings may be arranged to mix the cancellation signal with the incoming signal so as to cancel a leakage signal from the incoming signal. The second primary winding may be connected to a cancellation path that extends between the transmitter and receiver of the transceiver. The second primary port may be coupled to a second primary winding that may be wound so as to provide (e.g. generate) the cancellation signal, at least in part, by inverting a portion of a transmitter signal that is reproduced in the cancellation path. Other components in the cancellation path may provide amplitude and/or phase modulation to the cancellation signal so that the cancellation signal may be calibrated to be an additive inverse of the leakage signal, or an additive inverse of an approximation of the leakage signal in some examples. The cancellation circuit may tunable and may include only passive reactive components in some examples. Generally, passive reactive components refer to components, such as but not limited to, transformers, capacitors, inductors, and combinations thereof, which may not provide amplification and which oppose voltage and current changes through electrical and magnetic fields.

Figure 1:
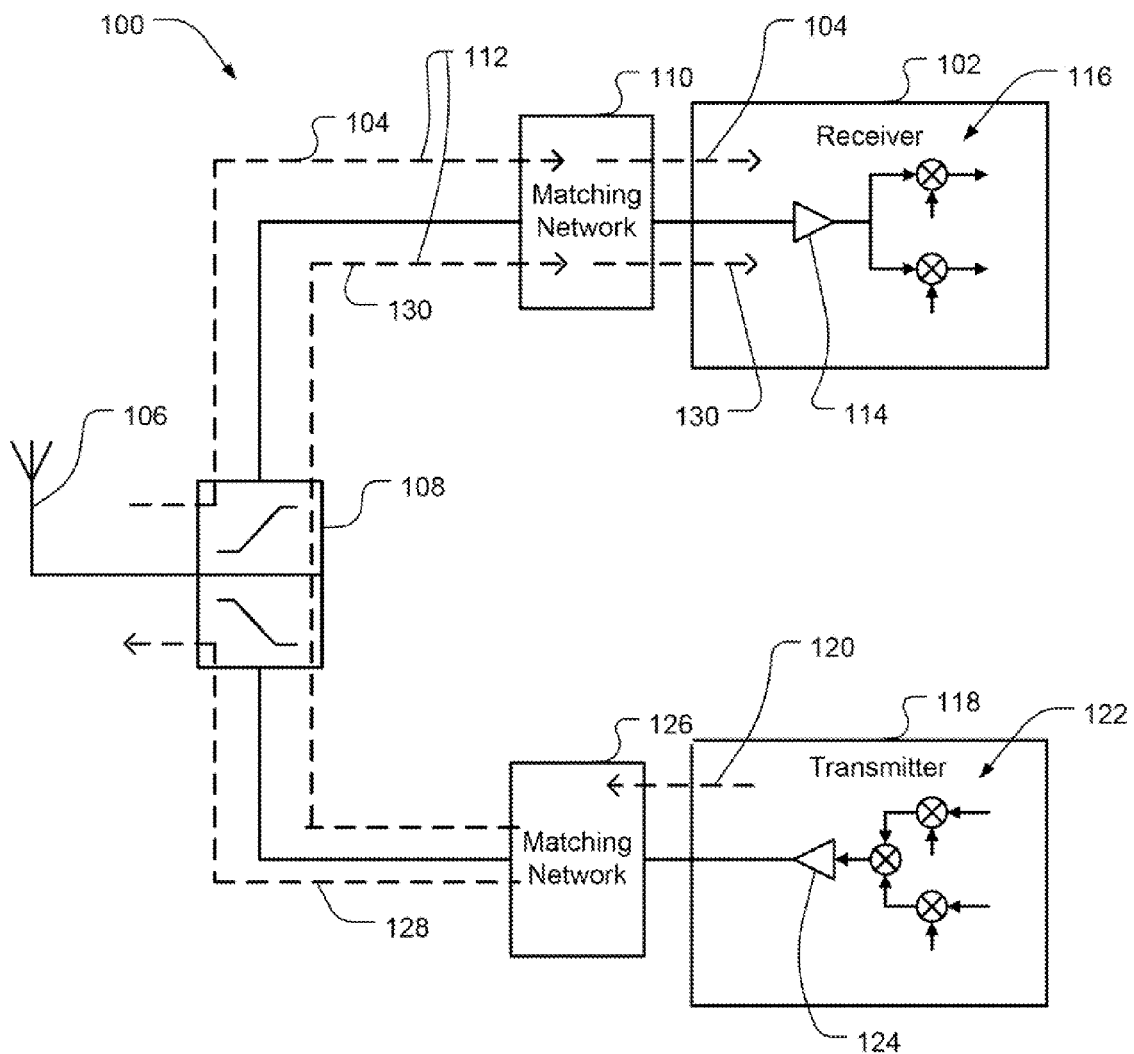
FIG. 1 is a schematic illustration of a prior art transceiver.

FIG. 1 is a circuit diagram of a prior art transceiver 100. The transceiver 100 is typical of a transceiver front end interface to the antenna that may be used, for example, to implement a transceiver for a variety of applications including but not limited to frequency division duplexing (FDD). Typically, transceivers that implement FDD communications include a receiver and a transmitter that may share the same antenna and may operate at the same time using a duplexer. As a result, a non-negligible transmitter leakage signal may be coupled through the duplexer so as to appear at the front-end of the receiver. The presence of the leakage signal at the front-end of the receiver may interfere with the receiver's ability to accurately receive signals as intended from the antenna. The schematic illustration shown in FIG. 1 illustrates certain components as functional blocks and omits other components for the sake of simplifying the diagram.

As shown in FIG. 1, the transceiver 100 includes a receiver 102 that may be coupled to an antenna 104. The transceiver 100 may in some examples be implemented on an integrated circuit chip. The antenna 104 may receive an off-chip signal, referred to herein as the received signal 104. The antenna 106 may be operatively connected to a filter 108 that operates, at least in part, to filter frequency components from the received signal 104 that is received by the antenna 106. The filter 108 may be a duplex filter.

The received signal 104 is passed to the receiver 102. The transceiver 100 may include an impedance matching network 110 that is part of the receiver 102 or that is disposed between the receiver 102 and the filter 108. The matching network 110 may provide impendence matching for the receiver 102. The received signal 104 is provided as input to the matching network 110, which then outputs the signal 104 having an adjusted impedance to the receiver 102. The receiver 102 additionally includes a low noise amplifier 114. The low noise amplifier 114 amplifies the received signal 104 and then passes the amplified signal to a demodulator 116. The demodulator 116 operates to remove the carrier frequency content of the received signal 112 and to output the information content of the received signal 112 on a frequency usable by the downstream circuits of the device with which the transceiver 100 is associated.

The transceiver 100 additionally includes a transmitter 118 that transmits a transmitter signal 120. The transmitter 114 generates the transmitter signal 120, at least in part, through the operation of a modulator 122 that takes one or more signals from circuits of the device with which the transceiver 100 is associated and mixes those signals with a carrier signal. These signals are frequency translated with a mixer and inputted to a power amplifier 124 that boosts the signal power. The transmitter signal 120 is then passed to a matching network 126 that outputs the transmitter signal 120 having adjusted impedance to the filter 108. The filter 108 then filters the transmitter signal 120, which filtered signal may then be transmitted off-chip by the antenna 106.

Transceivers may face the difficulty of a non-negligible transmitter leakage signal that is coupled, e.g. through the duplexer, so as to appear at the front-end of the receiver. This leakage signal is illustrated in FIG. 1 and is generally referred to with reference numeral 130. The leakage signal 130 may be or include a component of the transmitter signal 120 and may be coupled into the receiver 120 through the filter 108 As can be seen in FIG. 1, the transmitter signal 120 has components that include the leakage signal 130, as well as an outgoing signal component that is transmitted off-chip through the operation of the antenna 108. The outgoing signal is generally referred to with reference numeral 128. FIG. 1 additionally shows that the leakage signal 130 combines with the received signal 104 and these two signals enter the receiver 102 together. The combination of the leakage signal 130 and the received signal 104 is referred to herein as the incoming signal and is generally indicated by reference numeral 112.

Figure 2A:
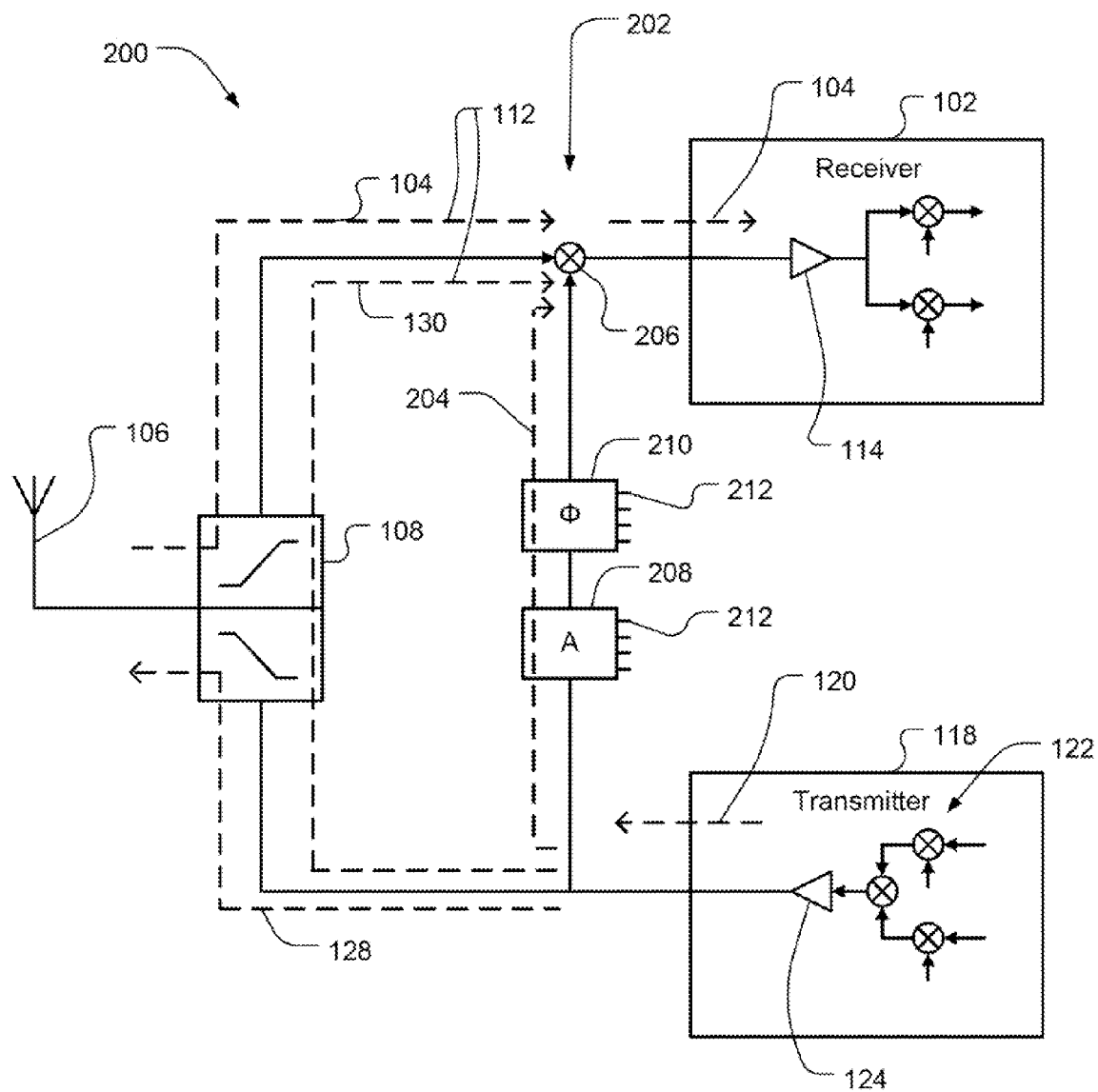
FIG. 2A is a schematic illustration of a transceiver arranged in accordance with present embodiments.

FIG. 2A is a schematic illustration of a transceiver 200 in accordance with present embodiments. The transceiver 200 is generally configured to address the problematic leakage signal 130, which is illustrated in FIG. 1. The transceiver 200 includes certain components that are also included in the transceiver 100 shown in FIG. 1. Specifically, the transceiver 200 includes a receiver 102 and a transmitter 118 that may be both associated with a duplex filter 108. The transceiver 200 may be implemented using one or more integrated circuit chips. The filter 108 may be operatively connected to an antenna 106 that is configured to send and receive off-chip signals. The filter 108 may operate to remove unwanted frequency components from a received signal 104 and to pass this filtered received signal 104 to the receiver 102. The filter 108 is also configured to remove unwanted frequency components from a transmitter signal 120, which signal or a portion thereof is transmitted from the antenna 106 as an outgoing signal 128. As mentioned above, an undesirable consequence of the operation of filter 108 is that a portion of the transmitter signal 120 (e.g. outgoing signal) may leak into the receiver of the transceiver 200. This leakage 130 combines with the received signal 104 to form an incoming signal 112 that arrives at the receiver 102. The transceiver 200 may address the problematic leakage signal 130 through the operation of a cancellation circuit 202.

Figure 2B:
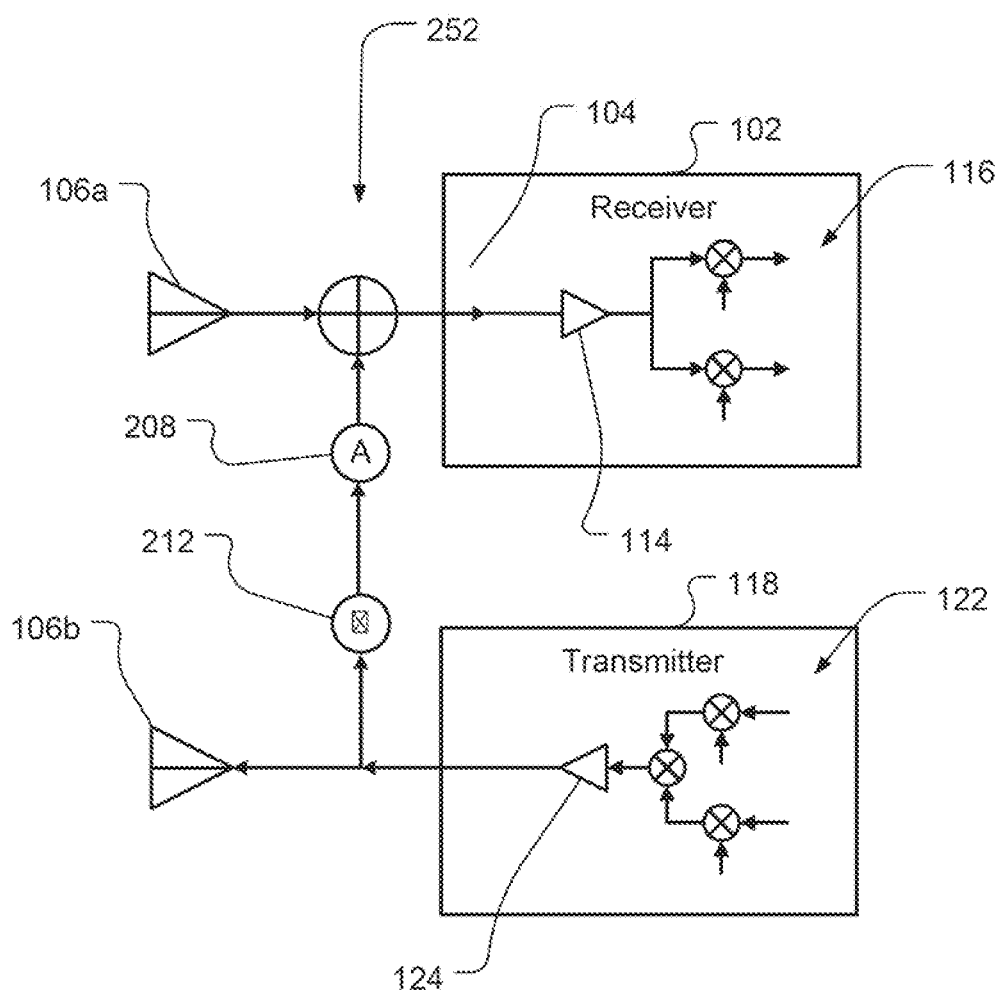
FIG. 2B is a schematic illustration of another transceiver arranged in accordance with present embodiments.

It should be appreciated that the duplex filter 108 is not a necessary component for the described cancellation system and method. Other embodiments may be used in implementations that do not use duplexer such as where one or more antennas are used for the receiver. For example, as shown in FIG. 2B, embodiments may be used in implementations that include two antennas 106a and 106b at the input. An additional one or more antennas could also be dedicated to the transmitter. Other embodiments of the canceller could be applied to transceiver front-ends in phased-array communication transceivers, or radar. In FIG. 2B, a cancellation circuit 252 may be used to provide a received signal to the receiver 102. The cancellation circuit 252 may include a multiport transformer as described herein that may combine an incoming signal with a portion of a transmitted signal to cancel a portion of the transmitted signal from the incoming signal. In this manner, a duplex filter may not be required, such as when a separate antenna is used for the transmitter and receiver. It should also be appreciated that the cancellation circuit 252 itself may not perform duplex filtering and may otherwise function independently of any duplex filtering performed in the overall circuit.

Referring again to FIG. 2A, the cancellation circuit 202 is configured to combine (e.g. inject) a cancellation signal with the received signal so as to cancel the leakage signal 130 or a portion thereof. This cancellation signal is illustrated in FIG. 2A and is generally referred to with reference numeral 204. Generally, the cancellation circuit 202 operates to produce a cancellation signal 204 that may be an additive inverse of the leakage signal 130 and/or an additive inverse of an approximation of the leakage signal 130. The cancellation circuit 202 may generally provide the cancellation signal 204 to the receiver 102 by combining (e.g. mixing, adding, subtracting) the cancellation signal 204 with the incoming signal 112, which, as described above, includes the received signal 104 and the leakage signal 130. Because the cancellation signal 202 is calibrated to be the additive inverse of the leakage signal 130 or an approximation thereof, the cancellation signal 202 and the leakage signal 130 generally cancel each other when the cancellation signal 202 is added to the incoming signal 112. With the leakage signal 130 cancelled from the incoming signal 112, the received signal 112 alone generally passes to the receiver 102.

The cancellation circuit 202 may generate or otherwise produce the cancellation signal 204 based on the transmitter signal 120 or a portion thereof. In this regard, the cancellation circuit 202 or a portion thereof may be disposed along a cancellation path 206 that extends between the transmitter 118 and the receiver 102. The cancellation path 206 operates to provide a portion of the transmitter signal 120 provided to the filter 108 to the cancellation circuit 202. In various embodiments, the cancellation path 206 is configured to present a high impedance to the transmitter 118 so as to have a negligible effect on the power of the outgoing signal 128. The cancellation circuit 202 may generate the cancellation signal 204 by manipulating the component of the transmitter signal 120 provided to the cancellation path 206.

In various embodiments, the cancellation path 206 is configured to present a high impedance to the transmitter 118 so as to have a negligible effect on the power of the outgoing signal 128. For example, cancellation path 206 may present a minimal amount of loading on the transmitter 118. Thus, the impedance looking into the cancellation path 206 from the transmitter 118 may be very high relative to the impedance looking into the transmitter 118 matching network 110, or antenna 106. This configuration results in negligible loading effects on the transmitter 118, with minimal attenuation of the desired transmit signal, which may minimize or reduce power loss, while maximizing or increasing transmitter efficiency.

In one respect, the cancellation circuit 202 may include an amplitude adjustment component 208. The amplitude adjustment component 208 operates to produce in the cancellation signal 204 an amplitude that is equal in magnitude but opposite in sign when compared to that of the leakage signal 130. For example, if the leakage signal 103 has an amplitude of 500 mV at a particular point in time, the amplitude adjustment component 208 may calibrate the cancellation signal 204 to have an absolute amplitude of 500 mV at that same point in time. The cancellation circuit may also, through the amplitude adjustment component or otherwise, be configured to provide the cancellation signal 204 being an additive inverse of the leakage signal—accordingly the amplitude of the cancellation signal at the point in time may be −500 mV, for example by being provided to a winding that is 180 degrees out of phase with a winding carrying the incoming signal including the leakage signal. The component of the transmitter signal 120 that is provided to the cancellation path 206 and the leakage signal 130 have similar amplitudes. Thus, amplitude adjustment component 208 may generate the cancellation signal 204, at least in part, by attenuating the component of the transmitter signal 120 that is provided to the cancellation path 206 so as to match the attenuation produced by the path that the leakage signal 130 takes through the filter 108. In this way, the amplitude adjustment component 208 produces a cancellation signal 204 that has an amplitude that is equal in magnitude when compared to that of the leakage signal 130.

The cancellation circuit 202 may additionally include a phase adjustment component 210. The phase adjustment component 210 may adjust the cancellation signal 204 so that the cancellation signal 204 is not out of phase with the leakage signal 130. The cancellation signal 204, which is calibrated to have an amplitude that is equal in magnitude but opposite in sign when compared to that of the leakage signal 130, may not cancel as effectively with the leakage signal 130 if these two signals arrive at the receiver 102 out of phase. These two signals may arrive at the receiver 102 out of phase, for example, because the amount of delay in the cancellation path 206 differs from the amount of delay in the path that the leakage signal 130 takes through the filter 108. The phase adjustment component 210 may account for this potential phase difference by adjusting the cancellation signal 204 so to be in phase with the leakage signal 130. In this way, the cancellation circuit 202 operates to produce a cancellation signal 204 that is the additive inverse of the leakage signal 130 at the point that the cancellation signal 204 combines with the incoming signal 112.

As shown in FIG. 2A, the amplitude adjustment component 208 and the phase adjustment component 210 may each include one or more inputs 212. These inputs may be configured to receive input signals that adjust an amount of attenuation or phase modulation that is applied to the cancellation signal 204. The input signals may be received from a calibration circuit that operates to calibrate various circuit components during one or more receive or transmit cycles of the transceiver 200. On other examples, a controller or other component may be used to provide the input signals. The calibration circuit may be associated only with the transceiver 200 or may be associated with the transceiver 200 and other components of the particular device with which the transceiver 200 is associated.

Figure 3A:
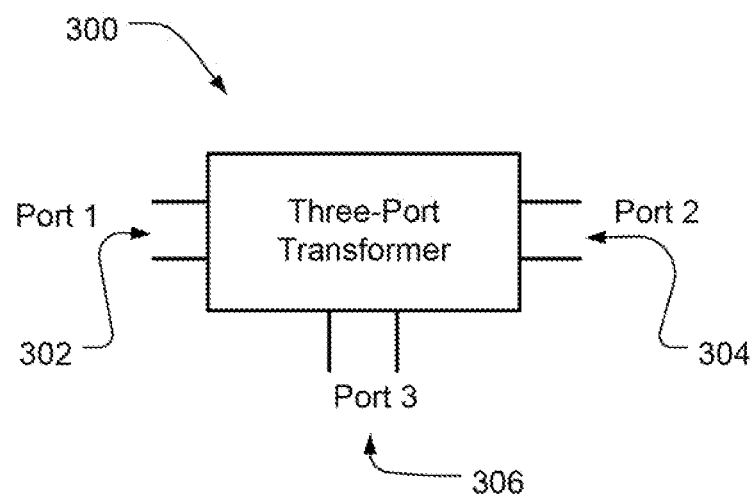
FIG. 3A is a block diagram of three-port transformer arranged in accordance with present embodiments.

In accordance with embodiments discussed herein, the cancellation signal 204 may be combined (e.g. mixed, added, subtracted) with the incoming signal 112 through the impedance matching network 110 that is associated with the receiver 102. As described above, the receiver 102 may include or may be associated with a matching network that may include a transformer having inductively coupled ports or windings that provide impendence matching for the receiver 102. FIG. 3A is a block diagram of a three-port transformer 300 that is adapted to perform this impedance matching function, as well as to provide for mixing of the cancellation signal 204 with the incoming signal 112. The three-port transformer 300 includes a first port 302 that is inductively coupled to at least a second port 304. Three-port transformer 300 is adapted to receive the incoming signal 112 as input at the first port 302 and to provide an output signal through the second port 304 that is based at least in part on the incoming signal 112. Thus, when implemented in connection with the circuit shown in FIG. 2A, the first port 302 is connected to the filter 108 and the second port 304 is connected to the low noise amplifier 114. The three-port transformer 300 additionally includes a third port 306 that is inductively coupled to the first port 302 and the second port 304. The third port 306 is adapted to receive an input signal that mixes with the incoming signal 112 received at the first port 302 to produce the signal that is output through the second port 304. It should be appreciated that canceller embodiments need not necessarily work with (e.g. be coupled to and/or provide input to) the low noise amplifier component of the receiver. In some cases, canceller embodiments may work with (e.g. be coupled to and/or provide input to) any block or component at the input of the receiver. For example, a canceller embodiment may provide a cancellation circuit which provides a signal to a mixer or other component in a "mixer first" receiver frontend. Other configurations of the cancellation circuit and/or cancellation path with receiver components may also be used.

Figure 3B:
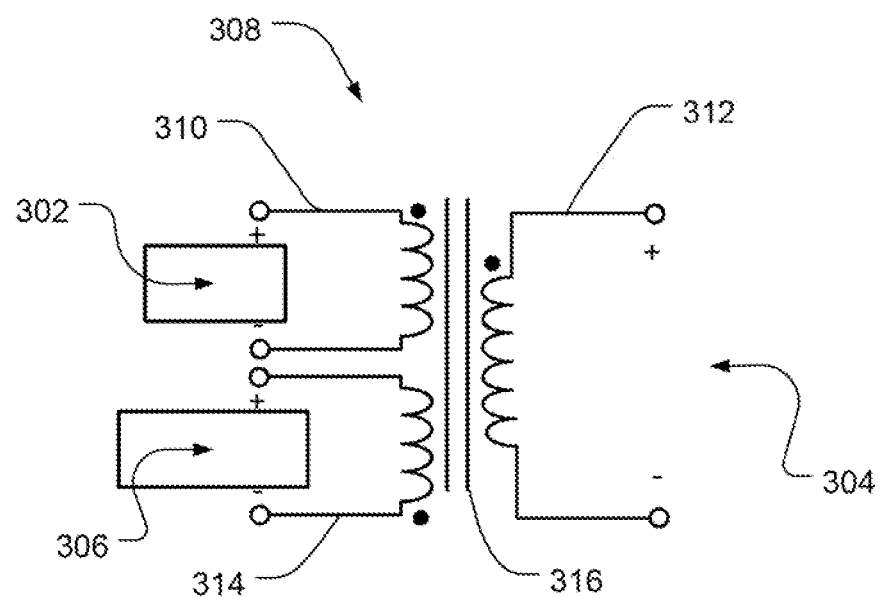
FIG. 3B is a schematic illustration of an implementation of the three-port transformer shown in FIG. 3A.

FIG. 38 is a schematic illustration of a three-port transformer implementation in which the third port 306 forms a portion of the cancellation circuit 202 that generates the cancellation signal 204. The three-port transformer implementation shown in FIG. 3B is generally referred to with reference numeral 308. The three-port transformer 308 includes a first port 302 coupled to a first primary winding 310, a second port 304 coupled to a secondary winding 312, and a third port 306 coupled to a second primary winding 314. Each of the windings 310, 312, and 314 is wound on a transformer core 316. The first primary winding 310 and the second primary winding 314 are each wound on the primary side of the transformer core 316. The secondary winding 312 is wound on the secondary side of the transformer core 316. As can be seen in the dot convention used in FIG. 3B, the second primary winding 314 is wound on the transformer core 316 in an opposite direction from the direction in which the first port winding 310 is wound on the transformer core 316 such that the signal carried by the second primary winding may be out of phase (e.g. 180 degrees out of phase)

with the signal carried by the first primary winding. This phase difference may result in the cancellation signal being effectively subtracted from the incoming signal. Accordingly, these windings may result in the third port 306 having opposite polarity from that of the first port 302. Because the polarity of the third port 306 is opposite from that of the first port 302, the signal received at the third port 306 is inverted with respect to the signal received at the first port 302. The third port 306 can be connected so as to be a portion of the cancellation circuit 202. For example, the third port 306 can be connected to the cancellation path 206 and the third port winding 314 can perform the function of inverting the component of the transmitter signal 120 that is provided to the cancellation path 206. Thus, the third port winding 314, along with perhaps other amplitude and phase modulation components associated with the cancellation circuit 202, can provide the cancellation signal 204.

In operation, the three-port transformer 308 combines the cancellation signal 204 with the incoming signal 112 so as to output the received signal 104. The first port 302 receives the incoming signal 112, which, as described above, includes the received signal 104 and the leakage signal 130. The third port 306 receives an input signal from the cancellation path 206 and, in combination with other components of the cancellation circuit 202, generates the cancellation signal 204. The cancellation signal 204 and the incoming signal 112 are combined by magnetic fields present in the mutual coupling associated with the inductance of both primaries, between the third port 306 and the first port 302. Because the cancellation signal 204 is calibrated to be the additive inverse of the leakage signal 130, the cancellation signal 204 and the leakage signal 130 generally cancel each other when the cancellation signal 204 is added to the incoming signal 112. With the cancellation signal 204 and the leakage signal 130 cancelled from the incoming signal 112, the received signal 112 alone is generated in the second port winding 312. In this way, the received signal 112 alone passes to the receiver 102 through the second port 304 of the three-port transformer 308. It should be noted that the cancellation signal is calibrated to be the additive inverse of the leakage signal in some examples. In an ideal example, the leakage signal may be entirely cancelled in this manner. However, in some examples, the cancellation signal may be the additive inverse of an approximation of the leakage signal or another portion of the leakage signal such that the leakage signal may be partially cancelled. The partial cancellation may cancel substantially all of the leakage signal in some examples.

Figure 4A:
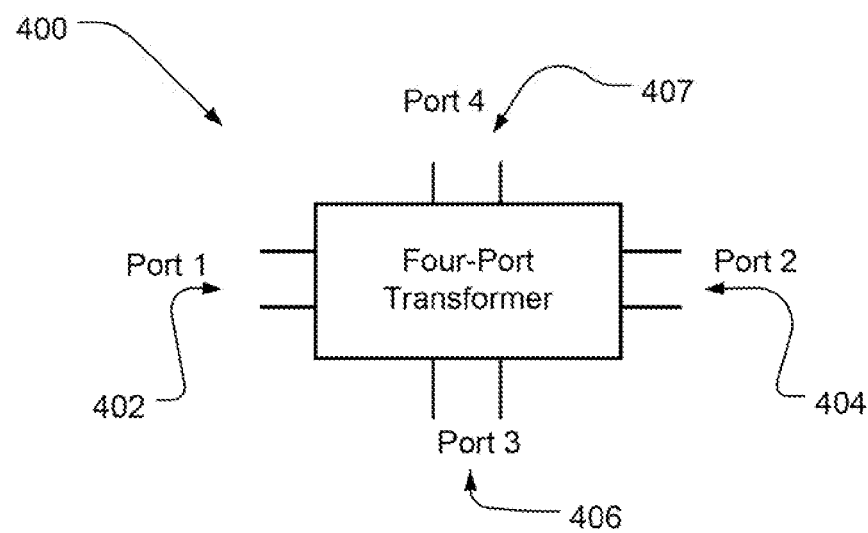
FIG. 4A is a block diagram of four-port transformer arranged in accordance with present embodiments.

FIG. 4A is a block diagram of a four-port transformer 400 in accordance with an alternative embodiment. The four-port transformer 400 is adapted to perform an impedance matching function, as well as to provide for mixing of the cancellation signal 204 with the incoming signal 112. The four-port transformer 400 differs from the three-port transformer 300 in that the four-port transformer 400 has separate inputs for the amplitude and phase modulation components of the cancellation circuit 202. Like the three-port transformer 300, the four-port transformer 400 includes a first port 402 that is inductively coupled to at least a second port 404. The four-port transformer 400 is adapted to receive the incoming signal 112 as input at the first port 402 and to provide an output signal through the second port 404 that is based at least in part on the incoming signal 112. Thus, when implemented in connection with the circuit shown in FIG. 2A, the first port 402 is connected to the filter 108 and the second port 404 is connected to the low noise amplifier 114. The four-port transformer 400 additionally includes a third port 406 and a fourth port 407 that are inductively coupled to the first port 402 and the second port 404. The third port 406 and the fourth port 407 are adapted to receive an input signal that combines with the incoming signal 112 received at the first port 404 to produce the signal that is output through the second port 404. Third port 406 and the fourth port 407 provide separate inputs for the amplitude and phase modulation components of the cancellation circuit 202.

Figure 4B:
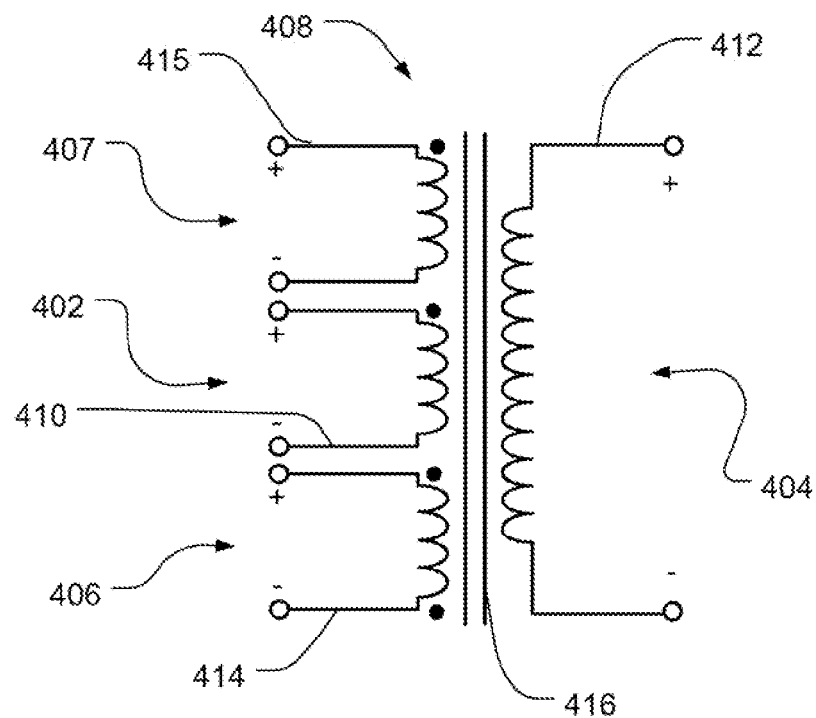
FIG. 4B is a schematic illustration of an implementation of the four-port transformer shown in FIG. 4A.

FIG. 4B is a schematic illustration of a four-port transformer implementation. The four-port transformer implementation shown in FIG. 4B is generally referred to with reference numeral 408. As was the case with the three-port transformer 308, the third port 406 of the four-port transformer 308 forms a portion of the cancellation circuit 202 that generates the cancellation signal 204. The four-port transformer 408 includes a first port 402 coupled to a first primary winding 410, a second port 404 coupled to a secondary winding 412, a third port 406 coupled to a second primary winding 414, and a fourth port 407 coupled to a third primary winding 415. Each of the windings 410, 412, 414, and 415 is wound on a transformer core 416. The first primary winding 410, the second primary winding 414, and the third primary winding 415 are each wound on the primary side of the transformer core 416. The secondary winding 412 is wound on the secondary side of the transformer core 416. As can be seen in the dot convention used in FIG. 4B, the second primary winding 414 is wound on the transformer core 416 in an opposite direction from the direction in which the first primary winding 410 is wound on the transformer core 416. These windings result in the third port 406 having opposite polarity from that of the first port 402. Because the polarity of the third port 406 is opposite from that of the first port 402, the signal received at the third port 406 is inverted with respect to the signal received at the first port 402. Thus, the third port 406 can be connected so as to be a portion of the cancellation circuit 202. Specifically, the third port 406 can be connected to the cancellation path 206 and the third port winding 414 can perform the function of inverting the component of the transmitter signal 120 that is diverted into the cancellation path 206. Thus, the third port winding 414, along with perhaps other amplitude modulation components associated with the cancellation circuit 202 can generate the cancellation signal 204. The fourth port 407 can be connected to components of the cancellation circuit 202 that adjust the phase of the cancellation signal 204.

In operation, the four-port transformer 408 combines the cancellation signal 204 with the incoming signal 112 so as to output the received signal 104. The first port 402 receives the incoming signal 112, which, as described above, includes the received signal 104 and the leakage signal 130. The third port 406 receives an input signal from the cancellation path 206 and, in combination with other components of the cancellation circuit 202, modulates the amplitude of the cancellation signal 204. The fourth port 407 receives an input signal that provides phase modulation for the cancellation signal 204. Together, the third port 406 and the fourth port 407 in part receive and in part generate the cancellation signal 204. The cancellation signal 204 and the incoming signal 112 mix due to the inductive coupling between the third port 406, the fourth port 407 and the first port 402. Because the cancellation signal 204 is calibrated to be the additive inverse of the leakage signal 130, the cancellation signal 204 and the leakage signal 130 cancel each other when the cancellation signal 204 is added to the incoming signal 112. With the cancellation signal 204 and the leakage signal 130 cancelled from the incoming signal 112, the received signal 112 alone is generated in the secondary winding 412. In this way, the received signal 112 alone passes to the receiver 102 through the second port 404 of the four-port transformer 408. It should be noted that the cancellation signal is calibrated to be the additive inverse of the leakage signal in some examples. In an ideal example, the leakage signal may be entirely cancelled in this manner. However, in some examples, the cancellation signal may be the additive inverse of an approximation of the leakage signal or another portion of the leakage signal such that the leakage signal may be partially cancelled. The partial cancellation may cancel substantially all of the leakage signal in some examples.

Figure 5:
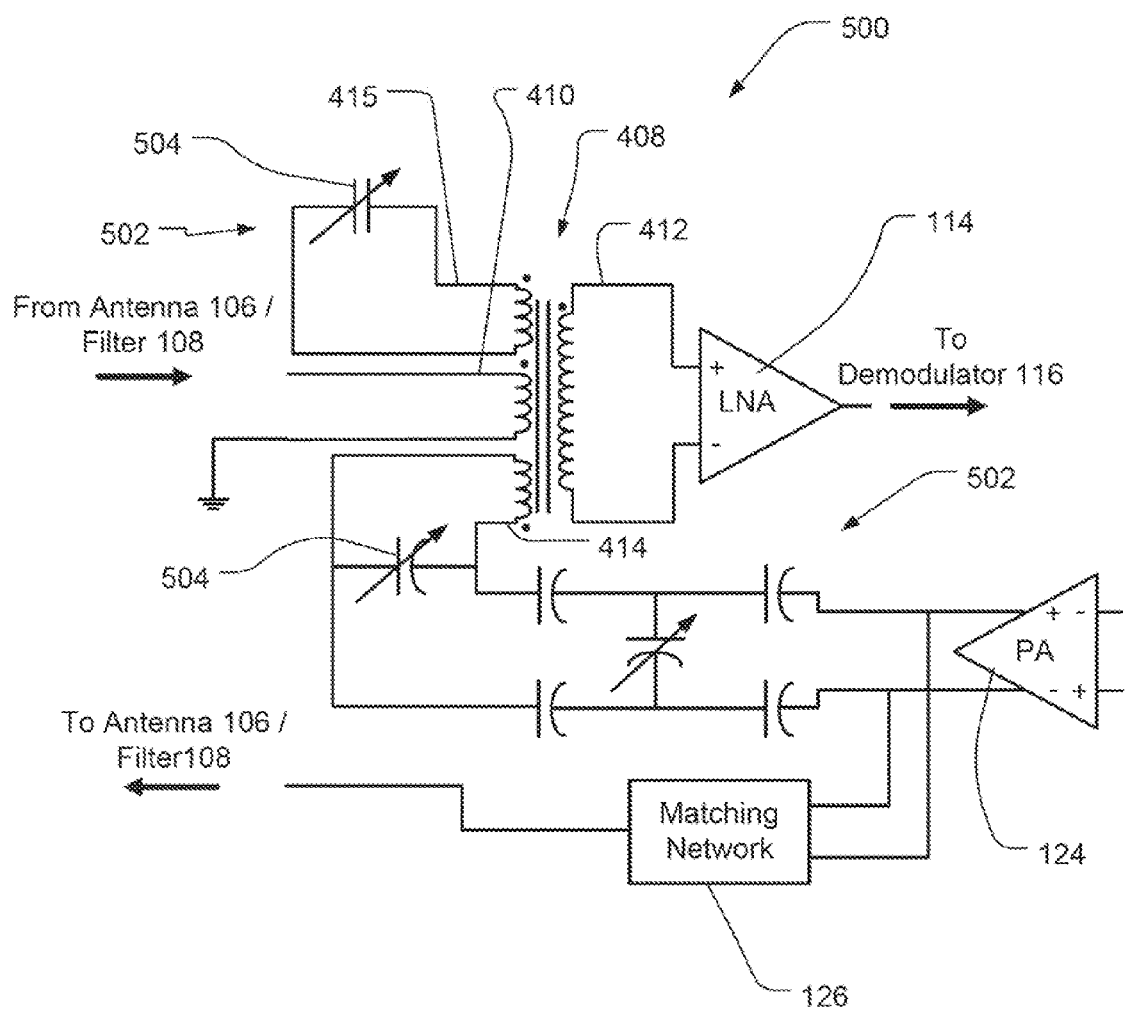
FIG. 5 is a schematic illustration of a portion of a transceiver that incorporates the four-port transformer shown in FIG. 4B.

FIG. 5 is a circuit diagram for a portion of a transceiver 500 that incorporates the four-port transformer 408 shown in FIG. 4B. The circuit diagram of FIG. 5 shows the low noise amplifier 114 on the receiver side of the transceiver 500. The low noise amplifier 114 contains an output that is connected to the demodulator 116. Additionally, the circuit diagram of FIG. 5 shows the power amplifier 124 on transmitter side of the transceiver 500. The power amplifier 124 has an output that connects to the filter 108 through the matching network 126. As mentioned above, an undesirable consequence of the operation of the filter 108 is that a residual leakage signal 130 (shown in FIG. 2A) may be coupled into the receiver side of the transceiver 500. It should be appreciated that canceller embodiments need not necessarily work with (e.g. be coupled to and/or provide input to) the low noise amplifier component of the receiver. In some cases, canceller embodiments may work with (e.g. be coupled to and/or provide input to) any block or component at the input of the receiver. For example, a canceller embodiment may provide input to a mixer or other component in a "mixer first" receiver frontend.

As shown in FIG. 5, the first primary winding 410 is connected to the filter 108 and the secondary winding 412 is connected to the low noise amplifier 114. Thus, the four-port transformer 400 is adapted to receive an incoming signal 112 (shown in FIG. 2A) as input at the first primary winding 410 and to provide an output signal through the secondary winding 412 that is based at least in part on the incoming signal 112. As described above, the incoming signal 112 includes the received signal 104 received from the antenna 106, as well as the leakage signal 130 coupled in through the filter 108. The second primary winding 414 and the third primary winding 415 provide separate inputs for the amplitude and phase modulation components of a cancellation circuit 502 that provides and generates a cancellation signal 204 (e.g. shown in FIG. 2A).

The transceiver 500 shown in FIG. 5 includes a cancellation circuit 502 having an amplitude adjustment component 508. The amplitude adjustment component 508, which is one method of producing amplitude adjustment with this canceller, functions generally as an attenuator and may include capacitors or any other component that would contribute to reducing the transmitter output power before injection into the receiver. Thus, in the embodiment shown in FIG. 5, the amplitude adjustment component 508 includes a network of capacitors 532 that provides a cancellation path 506 between the transmitter side and the receiver side of the transceiver 500. The capacitors 532, in part, generate the cancellation signal 204 by attenuating a component of the transmitter signal 120 (shown in FIG. 2A) that is provided to the cancellation path 506 so as to match the attenuation produced by the path that the leakage signal 130 takes through the filter 108. Additionally, the amplitude adjustment component 508 generates the cancellation signal 204 by optionally inverting the component of the transmitter signal 120 that is diverted into the cancellation path 506 and attenuated by the network of capacitors 532. For example, because the polarity of the second primary winding 414 is opposite from that of the first primary winding 410, the signal provided in the second primary winding 414 is inverted with respect to the signal received at first primary winding 410. In this way, the amplitude adjustment component 508 produces a cancellation signal 204 that has an amplitude that is equal in magnitude but opposite in sign when compared to that of the leakage signal 130, which is a component incoming signal 112. In other examples, the amplitude inversion may be accomplished by other components, and the polarity of certain transformer ports may not be opposite as shown. Recall, as shown in FIG. 2A, that input signals may be used to control the amplitude adjustment component 210. The amplitude adjustment component 210 may be implemented, as shown in FIG. 5, using the capacitor network 532. Accordingly, the input signals shown in FIG. 2A may include signals configured to set the capacitance of the variable capacitors shown in the capacitor network 532. In other examples, the input signals may perform other functions to change the capacitance provided by the amplitude adjustment component 210, such as but not limited to, adding or reducing capacitance (e.g. blowing fuses to connect or disconnect capacitors, set capacitance of variable capacitors).

The transceiver 500 shown in FIG. 5 additionally includes a phase adjustment component 510. The phase adjustment component 510 includes a capacitor 534 connected to the third primary winding 415. The capacitor 534 may be sized to account for a potential phase difference between the cancellation signal 204 the leakage signal 130 by adjusting the cancellation signal 204 so to be in phase with the leakage signal 130. In this way, the cancellation circuit 202 operates to produce a cancellation signal 204 that is the additive inverse of the leakage signal 130 at he point that the cancellation signal 204 combines with the incoming signal 112. Recall, as shown in FIG. 2A, that input signals may be used to control the amplitude adjustment component 208. The amplitude adjustment component 208 may be implemented, as shown in FIG. 5, using the capacitor 534. Accordingly, the input signals shown in FIG. 2A may include signals configured to set the capacitance of the capacitor 534. In other examples, the input signals may perform other functions to change the capacitance provided by the phase adjustment component 208, such as but not limited to, adding or reducing capacitance (e.g. blowing fuses to connect or disconnect capacitors, set capacitance of variable capacitors).

In accordance with present embodiments, a cancellation circuit includes only passive reactive components. Passive reactive components may not introduce significant additional noise, and therefore may be advantageous for use in the cancellation circuit, where addition of noise to the cancellation signal may be undesirable in some examples. Generally, passive reactive components refer to components, such as but not limited to, transformers, capacitors, inductors, and combinations thereof, which may not provide amplification and which oppose voltage and current changes through electrical and magnetic fields. For example, the cancellation circuit 502 shown in FIG. 5 includes only passive reactive components, namely capacitors 504 and transformer windings 414 and 415. The cancellation circuit 502 may not include active components which produce thermal noise. Likewise, the cancellation circuit 502 may not include resistive components which produce Johnson noise. There are parasitic resistances associated with the inductors, transformers, capacitors, and switches. However, from the perspective of noise generation, these resistances are so small, that their noise production is negligible.

One or more of the capacitors of the amplitude adjustment component 508 and/or the phase adjustment component 510 may be variable (e.g. tunable). These tunable capacitors may have inputs configured to receive input signals that adjust an amount of attenuation or phase modulation that is applied to the cancellation signal 204. The input signals may be received from a calibration circuit that operates to calibrate various circuit components during one or more receive or transmit cycles of the transceiver 500. The calibration circuit may be associated only with the transceiver 500 or may be associated with the transceiver 500 and other components of the particular device with which the transceiver 500 is associated.

In operation, the transceiver 500 uses the four-port transformer 408 to mix the cancellation signal 204 with the incoming signal 112 so as to output the received signal 104. The first primary winding 410 receives the incoming signal 112, which, as described above, includes the received signal 104 and the leakage signal 130. The second primary winding 414 receives an input signal from the cancellation path 506 and, in combination with the network of capacitors 532, modulates the amplitude of the cancellation signal 204. The third primary winding 415 receives an input signal that provides phase modulation for the cancellation signal 204, Together, the second primary winding 414 and the third primary winding 415 in part receive and in part generate the cancellation signal 204. The cancellation signal 204 and the incoming signal 112 mix due to the inductive coupling between the second primary winding 414, the third primary winding 415 and the first primary winding 410. Because the cancellation signal 204 is calibrated to be the additive inverse of the leakage signal 130, the cancellation signal 204 and the leakage signal 130 generally cancel each other when the cancellation signal 204 is added to the incoming signal 112. With the cancellation signal 204 and the leakage signal 130 cancelled from the incoming signal 112, the received signal 112 alone is generated in the second port winding 412. In this way, the received signal 112 alone passes to the low noise amplifier 114 on the receiver side of the transceiver 500.

Figure 6:
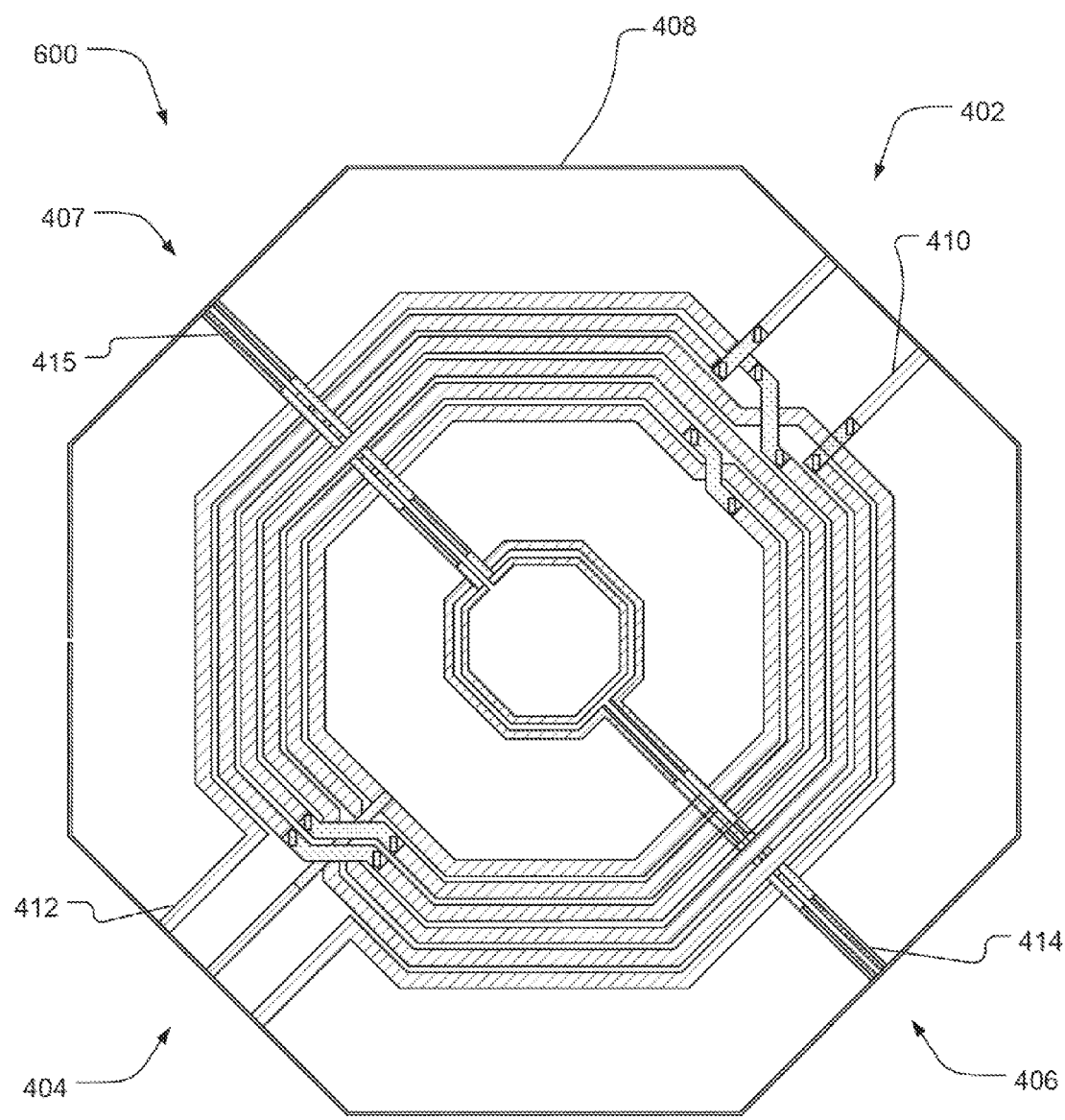
FIG. 6 is a schematic illustration of an example layout for the four-port transformer shown in FIG. 4B.

FIG. 6 is a schematic illustration of an example layout 600 for the four-port transformer 408 shown in FIG. 4B. The four-port transformer 408 includes a first port 402 coupled to a first primary winding 410, a second port 404 coupled to a secondary winding 412, a third port 406 coupled to a second primary winding 414, and a fourth port 407 coupled to a third primary winding 415. Each of the windings 410, 412. 414, and 415 is wound on a transformer core 416. The first primary winding 410, the second primary winding 414, and the third primary winding 415 are each wound on the primary side of the transformer core 416.

It may be the case that the cancellation signal 204 that is presented to the transformer 408 is stronger than the leakage signal 130 presented to the transformer 408 from the leakage through the filter 108 and/or antenna 106. To accommodate this difference, the primary winding 414 couple to the third port 406 may be smaller than primary winding 410 coupled to the first port 402. Thus, the magnetic coupling through the third port 406 to the receiver 102 may be weaker than the magnetic coupling from the first port 402 to the receiver 102. FIG. 6 illustrates an example of this difference in size between the primary winding 414 coupled to the third port 406 and the primary winding 410 coupled to the first port 402.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined In the following claims.

The invention claimed is:

1. A transceiver, comprising:
a transmitter configured to transmit an outgoing signal;
a receiver configured to receive a received signal; and
a cancellation circuit, the cancellation circuit configured to combine a cancellation signal with an incoming signal to provide the received signal, the cancellation circuit comprising a transformer and a cancellation path, the transformer comprising:
a first primary winding, the first primary winding configured to receive the incoming signal;
a second primary winding, the second primary winding coupled to the transmitter and configured to receive the cancellation signal from the cancellation path, wherein the cancellation signal is based, at least in part on the outgoing signal; and
a secondary winding inductively coupled to the first and second primary windings;
wherein the first and second primary windings are configured to have a phase relationship such that the second primary winding changes the phase of the cancellation signal with respect to the phase of the cancellation signal in the cancellation path such that the cancellation signal is at least partially subtracted from the incoming signal to generate the received signal in the secondary winding.

2. The transceiver of claim 1, wherein the cancellation path provides a signal pathway from the transmitter to the receiver and includes only reactive components.

3. The transceiver of claim 1, wherein:
the first primary winding is operatively coupled to an antenna to receive the incoming signal;
the receiver further comprises an amplifier and the secondary winding is coupled to the amplifier and configured to provide the received signal to the amplifier.

4. The transceiver of claim 1, wherein the incoming signal includes the received signal and a leaked signal, wherein the leaked signal is based, at least in part, on coupling between the outgoing signal and the receiver, and wherein the cancellation path generates the cancellation signal such that the cancellation signal in the cancellation path matches the phase of the leaked signal, wherein the second primary winding inverts the phase of the cancellation signal such that the cancellation signal and the leaked signal substantially cancel each other from the received signal in the primary winding.

5. The transceiver of claim 4, wherein the cancellation circuit further comprises an attenuator that includes only reactive components and that is coupled between the transmitter and the second primary winding, the attenuator configured to modulate an amplitude of the cancellation signal to match the leaked signal.

6. The transceiver of claim 5, wherein the attenuator includes tunable capacitors and the capacitors are configured to be tuned during a calibration phase of the transceiver.

7. The transceiver of claim 5, wherein:
the transformer further comprises a third primary winding, wherein the third primary winding is inductively coupled to the secondary winding; and
wherein the cancellation circuit further comprises a phase modulator coupled to the third primary winding, wherein the phase modulator is configured to modulate a phase of the cancellation signal to match a phase of the leaked signal.

8. The transceiver of claim 7, wherein the phase modulator comprises a tunable capacitor disposed between the first and second phase modulator leads.

9. The transceiver of claim 1, wherein the cancellation circuit presents a high impedance to the transmitter.

10. The transceiver of claim 1, wherein the receiver and the transmitter are implemented on the same integrated circuit chip.

11. A receiver, comprising:
a low noise amplifier;
a transformer comprising first and second primary windings and a secondary winding inductively coupled to the first and second primary windings, the secondary winding further coupled to the low noise amplifier; wherein
the first primary winding is operatively connected to an antenna to receive an incoming signal;
the second primary winding is configured to couple to a transmitter and receive a cancellation signal from a cancellation path based, at least in part, on an outgoing signal, wherein the cancellation signal is calibrated to at least partially cancel a leakage signal present at the first primary winding; and
the first and second primary windings are configured to have a phase relationship such that the second primary winding changes the phase of the cancellation signal with respect to the phase of the cancellation signal in the cancellation path such that the cancellation signal is at least partially subtracted from the incoming signal to generate a received signal in the secondary winding.

12. The receiver of claim 11, wherein the leakage signal is a component of the outgoing signal and is due at least in part to leakage from the transmitter.

13. The receiver of claim 12, wherein the cancellation circuit further comprises an attenuator, the attenuator comprising: a plurality of tunable capacitors configured to modulate an amplitude of the outgoing signal to generate the cancellation signal.

14. The receiver of claim 13, wherein the tunable capacitors are configured to modulate the amplitude such that the cancellation signal has an amplitude that matches an amplitude of the leakage signal.

15. The receiver of claim 11, wherein:
the transformer further comprises a third primary winding that is inductively coupled to the secondary winding; and
the cancellation circuit further comprises a phase modulator coupled to the third primary winding and configured to shift a phase of the cancellation signal to match a phase of the leakage signal.

16. The receiver of claim 15, wherein the phase modulator comprises a tunable capacitor.

17. An interference cancellation method, comprising:
receiving an incoming signal at a receiver;
transmitting an outgoing signal from a transmitter;
generating a cancellation signal based on the outgoing signal; and
providing the cancellation signal to the receiver through a cancellation path; and
combining the cancellation signal with the incoming signal including changing the phase of the cancellation signal with respect to the phase of the cancellation signal in the cancellation path, using at least a three-port transformer, to provide a received signal.

18. The interference cancellation method of claim 17, wherein generating the cancellation signal includes modulating an amplitude of the cancellation signal to match an amplitude of a leakage signal included in the incoming signal, wherein the leakage signal is based, at least in part, on the outgoing signal.

19. The interference cancellation method of claim 17, wherein combining the cancellation signal with the incoming signal comprises using at least a four-port transformer.

20. The noise cancellation method of claim 19, wherein generating the cancellation signal includes modulating a phase of the cancellation signal to match a phase of a leakage signal included in the incoming signal, wherein the leakage signal is based, at least in part, on the outgoing signal.

* * * * *